US011298686B2

(12) United States Patent
Goto et al.

(10) Patent No.: US 11,298,686 B2
(45) Date of Patent: *Apr. 12, 2022

(54) HONEYCOMB CATALYTIC CONVERTER

(71) Applicants: IBIDEN CO., LTD., Ogaki (JP); TOYOTA JIDOSHA KABUSHIKI KAISHA, Toyota (JP)

(72) Inventors: Shinnosuke Goto, Ibi-gun (JP); Takeru Yoshida, Toyota (JP); Takumi Tojo, Toyota (JP); Hiromasa Suzuki, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/830,276

(22) Filed: Mar. 26, 2020

(65) Prior Publication Data
US 2020/0222883 A1 Jul. 16, 2020

Related U.S. Application Data

(63) Continuation of application No. PCT/JP2018/035844, filed on Sep. 27, 2018.

(30) Foreign Application Priority Data

Sep. 27, 2017 (JP) .............................. JP2017-186474

(51) Int. Cl.
*B01J 21/04* (2006.01)
*B01J 21/06* (2006.01)
(Continued)

(52) U.S. Cl.
CPC .......... *B01J 23/63* (2013.01); *B01D 53/9468* (2013.01); *B01J 23/10* (2013.01); *B01J 35/04* (2013.01);
(Continued)

(58) Field of Classification Search
CPC ........ B01J 21/04; B01J 21/066; B01J 23/002; B01J 23/44; B01J 23/464; B01J 23/63; B01J 35/04; B01J 23/10; F01N 3/2803
See application file for complete search history.

(56) References Cited

U.S. PATENT DOCUMENTS 5,139,992 A  8/1992  Tauster et al.
5,296,198 A * 3/1994  Abe ...................... F01N 3/0835
422/180
(Continued)

FOREIGN PATENT DOCUMENTS

EP  0559844 B1  9/1993
EP  0798042     10/1997
(Continued)

OTHER PUBLICATIONS

Office Action with Form PTO-892 Notice of References Cited issued by the United States Patent and Trademark Office for the co-pending U.S. Appl. No. 16/830,275, dated Jan. 7, 2021.
(Continued)

*Primary Examiner* — Cam N. Nguyen
(74) *Attorney, Agent, or Firm* — Mori & Ward, LLP

(57) ABSTRACT

The present invention relates to a honeycomb catalytic converter including: a honeycomb structured body in which multiple through-holes are arranged longitudinally in parallel with one another with a partition wall therebetween; and a noble metal supported on the honeycomb structured body, wherein the honeycomb structured body contains a ceria-zirconia complex oxide and alumina, each partition wall includes a first carrier layer defining a surface layer of the partition wall and carrying Pd, and a second carrier layer located more inwardly of the partition wall than the first carrier layer and carrying Rh.

17 Claims, 2 Drawing Sheets

(51) Int. Cl.
| | |
|---|---|
| *B01J 23/10* | (2006.01) |
| *B01J 23/44* | (2006.01) |
| *B01J 23/46* | (2006.01) |
| *B01J 23/63* | (2006.01) |
| *B01J 35/04* | (2006.01) |
| *F01N 3/28* | (2006.01) |
| *B01D 53/94* | (2006.01) |

(52) U.S. Cl.
CPC ........ *F01N 3/28* (2013.01); *B01D 2255/1023* (2013.01); *B01D 2255/1025* (2013.01); *B01D 2255/9022* (2013.01); *B01D 2255/9202* (2013.01); *F01N 2330/02* (2013.01); *F01N 2370/02* (2013.01)

(56) References Cited

U.S. PATENT DOCUMENTS

| | | | | |
|---|---|---|---|---|
| 5,318,757 | A * | 6/1994 | Abe | F01N 3/2026 |
| | | | | 422/174 |
| 5,376,610 | A * | 12/1994 | Takahata | F01N 13/0097 |
| | | | | 502/66 |
| 5,459,119 | A * | 10/1995 | Abe | B01J 37/0248 |
| | | | | 502/326 |
| 5,753,580 | A | 5/1998 | Hayashi et al. | |
| 5,895,700 | A | 4/1999 | Yamada et al. | |
| 6,087,298 | A | 7/2000 | Sung et al. | |
| 6,492,297 | B1 | 12/2002 | Sung | |
| 6,497,851 | B1 | 12/2002 | Hu et al. | |
| 7,731,774 | B2 * | 6/2010 | Ohno | F01N 3/0222 |
| | | | | 55/523 |
| 7,737,077 | B2 | 6/2010 | Kitamura et al. | |
| 7,759,283 | B2 * | 7/2010 | Yamato | B01D 53/944 |
| | | | | 502/339 |
| 7,871,452 | B2 * | 1/2011 | Yamada | B01J 37/024 |
| | | | | 55/523 |
| 8,048,382 | B2 | 11/2011 | Ohno et al. | |
| 8,071,502 | B2 | 12/2011 | Shimizu et al. | |
| 8,207,078 | B2 | 6/2012 | Lu et al. | |
| 8,226,898 | B2 | 7/2012 | Miwa et al. | |
| 8,323,766 | B2 * | 12/2012 | Ido | C04B 37/005 |
| | | | | 428/116 |
| 8,323,767 | B2 * | 12/2012 | Ido | B01J 37/0201 |
| | | | | 428/116 |
| 8,580,705 | B2 * | 11/2013 | Aoki | B01D 53/945 |
| | | | | 502/304 |
| 8,691,157 | B2 * | 4/2014 | Kunieda | B01J 29/88 |
| | | | | 422/180 |
| 8,796,172 | B2 * | 8/2014 | Chinzei | B01J 37/0248 |
| | | | | 502/327 |
| 8,961,886 | B2 * | 2/2015 | Kunieda | B01J 29/88 |
| | | | | 422/177 |
| 9,266,092 | B2 | 2/2016 | Arnold et al. | |
| 9,550,169 | B2 * | 1/2017 | Kadota | C04B 38/0006 |
| 9,597,663 | B2 | 3/2017 | Inoda et al. | |
| 9,700,842 | B2 * | 7/2017 | Miyairi | B01D 46/2459 |
| 10,472,290 | B2 * | 11/2019 | Goto | B01D 53/94 |
| 10,507,457 | B2 * | 12/2019 | Kadota | C04B 35/50 |
| 10,625,208 | B2 | 4/2020 | Bergeal et al. | |
| 10,953,395 | B2 * | 3/2021 | Goto | C04B 35/6365 |
| 2004/0001781 | A1 | 1/2004 | Kumar et al. | |
| 2008/0081761 | A1 | 4/2008 | Suzuki | |
| 2009/0239744 | A1 * | 9/2009 | Ohno | C04B 38/0006 |
| | | | | 502/328 |
| 2009/0246103 | A1 * | 10/2009 | Ohno | B01J 37/0009 |
| | | | | 422/222 |
| 2009/0291826 | A1 * | 11/2009 | Ohno | B01D 46/2455 |
| | | | | 502/64 |
| 2010/0087314 | A1 | 4/2010 | Kitamura et al. | |
| 2010/0196221 | A1 * | 8/2010 | Ando | B01J 23/42 |
| | | | | 422/171 |
| 2010/0263357 | A1 * | 10/2010 | Lindner | B01J 37/0244 |
| | | | | 60/299 |
| 2011/0200505 | A1 | 8/2011 | Cavataio et al. | |
| 2012/0070346 | A1 | 3/2012 | Mizutani et al. | |
| 2013/0011304 | A1 * | 1/2013 | Schumann | C04B 35/478 |
| | | | | 422/168 |
| 2013/0336864 | A1 | 12/2013 | Zheng et al. | |
| 2014/0030158 | A1 * | 1/2014 | Takagi | B01J 37/031 |
| | | | | 422/168 |
| 2014/0205523 | A1 | 7/2014 | Arnold et al. | |
| 2015/0209726 | A1 * | 7/2015 | Difrancesco | B01D 53/8628 |
| | | | | 422/180 |
| 2015/0375206 | A1 | 12/2015 | Aoki | |
| 2016/0074800 | A1 * | 3/2016 | Ito | B01D 46/2418 |
| | | | | 428/117 |
| 2017/0306823 | A1 | 10/2017 | Onoe et al. | |
| 2018/0015411 | A1 * | 1/2018 | Onoe | B01D 53/94 |
| 2018/0229183 | A1 | 8/2018 | Kadota et al. | |
| 2019/0136730 | A1 * | 5/2019 | Onozuka | B01J 37/0234 |
| 2019/0143312 | A1 * | 5/2019 | Goto | C04B 35/6268 |
| | | | | 502/304 |
| 2019/0144342 | A1 * | 5/2019 | Goto | B01D 53/94 |
| | | | | 422/180 |

FOREIGN PATENT DOCUMENTS

| | | |
|---|---|---|
| EP | 2130600 | 12/2009 |
| EP | 2556871 | 2/2013 |
| GB | 2558186 | 7/2018 |
| JP | 62-068543 | 3/1987 |
| JP | 07-060117 | 3/1995 |
| JP | 10-296085 | 11/1998 |
| JP | 2002-210371 | 7/2002 |
| JP | 2004-066069 | 3/2004 |
| JP | 2005-530614 | 10/2005 |
| JP | 2006-188404 | 7/2006 |
| JP | 2006-205050 | 8/2006 |
| JP | 2009-011937 | 1/2009 |
| JP | 2009-255032 | 11/2009 |
| JP | 2009-273988 | 11/2009 |
| JP | 2010-127210 | 6/2010 |
| JP | 2012-040547 | 3/2012 |
| JP | 2013-522020 | 6/2013 |
| JP | 2014-147858 | 8/2014 |
| JP | 2014-151306 | 8/2014 |
| JP | 2015-085241 | 5/2015 |
| JP | 2016-505380 | 2/2016 |
| JP | 2016-123890 | 7/2016 |
| JP | 2016-131968 | 7/2016 |
| JP | 2017-006827 | 1/2017 |
| JP | 2017-039069 | 2/2017 |
| WO | WO 2004/002621 | 1/2004 |
| WO | WO 2011/125766 | 10/2011 |
| WO | WO 2014/116897 | 7/2014 |
| WO | WO 2016/060048 | 4/2016 |

OTHER PUBLICATIONS

Office Action with Form PTO-892 Notice of References Cited issued by the United States Patent and Trademark Office for the co-pending U.S. Appl. No. 16/830,277, dated Jan. 7, 2021.
Office Action with Form PTO-892 Notice of References Cited issued by the United States Patent and Trademark Office for the co-pending U.S. Appl. No. 16/830,275, dated Jul. 19, 2021.
Office Action with Form PTO-892 Notice of References Cited issued by the United States Patent and Trademark Office for the co-pending U.S. Appl. No. 16/830,277, dated Aug. 4, 2021.
Office Action with Form PTO-892 Notice of References Cited issued by the United States Patent and Trademark Office for the co-pending U.S. Appl. No. 16/830,272, dated Aug. 31, 2021.
Office Action with Form PTO-892 Notice of References Cited issued by the United States Patent and Trademark Office for the co-pending U.S. Appl. No. 16/830,278, dated Aug. 31, 2021.
Advisory Action issued by the U.S. Patent and Trademark Office for the co-pending U.S. Appl. No. 16/830,275, filed Nov. 19, 2021.
Notice of Allowance issued by the United States Patent and Trademark Office for the co-pending U.S. Appl. No. 16/830,272, filed Dec. 13, 2021.

(56) References Cited

OTHER PUBLICATIONS

Notice of Allowance issued by the United States Patent and Trademark Office for the co-pending U.S. Appl. No. 16/830,278, filed Dec. 14, 2021.
Advisory Action issued by the U.S. Patent and Trademark Office for the co-pending U.S. Appl. No. 16/830,277, filed Dec. 15, 2021.
Office Action with Form PTO-892 Notice of References Cited issued by the United States Patent and Trademark Office for the co-pending U.S. Appl. No. 16/830,279, dated Feb. 3, 2022.

* cited by examiner

HONEYCOMB CATALYTIC CONVERTER

TECHNICAL FIELD

The present invention relates to a honeycomb catalytic converter.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating the slurry containing noble metal particles having catalytic activity on a honeycomb monolithic substrate made of cordierite or the like.

Patent Literature 1 discloses an exhaust gas catalytic converter including a Pd-carrying porous substrate and a Rh-carrying coat layer made of a ceria-zirconia solid solution on the porous substrate.

CITATION LIST

Patent Literature

Patent Literature 1: JP 2017-39069 A

SUMMARY OF INVENTION

Technical Problem

Yet, there is a demand for a honeycomb catalytic converter that exhibits higher exhaust gas conversion performance than the exhaust gas catalytic converter disclosed in Patent Literature 1.

The present inventors conducted extensive studies on the exhaust gas catalytic converter disclosed in Patent Literature 1. As a result, the present inventors found that the catalytic activity of Pd supported on the porous substrate is not sufficiently exhibited.

In Patent Literature 1, a coat layer in which Rh having an effect to reduce NOx is supported in a solid solution of ceria and zirconia is formed on the porous substrate carrying Pd having an effect to oxidize CO and HC.

Since HC has a larger molecular size, presumably, HC does not easily diffuse from a surface of the coat layer made of a solid solution of ceria and zirconia to the porous substrate side, and cannot sufficiently reach the inside of the porous substrate where Pd is present.

The present invention was made to solve the above problem. An object of the present invention is to provide a honeycomb catalytic converter capable of achieving higher HC conversion performance.

Solution to Problem

Specifically, the present invention provides a honeycomb catalytic converter including: a honeycomb structured body in which multiple through-holes are arranged longitudinally in parallel with one another with a partition wall therebetween; and a noble metal supported on the honeycomb structured body, wherein the honeycomb structured body contains a ceria-zirconia complex oxide and alumina, each partition wall includes a first carrier layer defining a surface layer of the partition wall and carrying Pd, and a second carrier layer located more inwardly of the partition wall than the first carrier layer and carrying Rh.

In the honeycomb catalytic converter of the present invention, since Pd is supported on the first carrier layer with which exhaust gas easily comes into contact, there are sufficient chances for HC and CO to contact Pd. Thus, Pd can sufficiently exhibit its function as an oxidation catalyst.

Rh is supported on the second carrier layer. NOx has a smaller molecular size than HC and thus easily reaches the second carrier layer. Thus, Rh can sufficiently exhibit its function as a NOx reduction catalyst.

In addition, since Pd particles and Rh particles are not adjacently located, Pd and Rh are prevented from forming an alloy, which can prevent a decrease in catalytic effect.

In the honeycomb catalytic converter of the present invention, preferably, the Rh concentration on the first carrier layer side of the second carrier layer is higher than the Rh concentration in the center of the second carrier layer.

When the Rh concentration on the first carrier layer side of the second carrier layer is higher than the Rh concentration in the center of the second carrier layer (i.e., Rh is concentrated on the first carrier layer side), Rh can exhibit catalytic activity even when NOx does not reach the deep portion of the second carrier layer, thus easily achieving higher exhaust gas conversion performance.

Herein, that "Rh supported on the second carrier layer is concentrated on the first carrier layer side" can be confirmed by element mapping of a cross section of the partition walls cut in a direction perpendicular to a longitudinal direction of the honeycomb catalytic converter by an electron probe micro analyzer (also referred to as "EPMA") or the like.

Specifically, first, a combination of a 10 μm×10 μm region in the center (a central portion in the thickness direction) of a second carrier layer and a 10 μm×10 μm region on a surface of the second carrier layer away from the center and located on the first carrier layer side is selected from second carrier layer portions in an element mapping image of the partition walls. Ten such combinations are randomly selected. Subsequently, in each combination of the regions, the Rh concentration is compared between the 10 μm×10 μm region in the center of the second carrier layer and the 10 μm×10 μm region on the surface of the second carrier layer. When the Rh concentration of the element in the 10 μm×10 μm region on the surface of the second carrier layer is higher than the Rh concentration in the 10 μm×10 μm region in the center of the second carrier layer in all the combinations, the Rh concentration of on the surface on the first carrier layer side of the second carrier layer is determined to be higher than the Rh concentration in the center of the second carrier layer.

In the honeycomb catalytic converter of the present invention, preferably, the honeycomb structured body further contains an inorganic binder.

When the honeycomb structured body further contains an inorganic binder, the mechanical strength of the honeycomb structured body can be increased.

In the honeycomb catalytic converter of the present invention, preferably, the first carrier layer is a coat layer containing a ceria-zirconia complex oxide, alumina, and Pd, and the second carrier layer is an extrudate containing ceria-zirconia complex oxide particles and alumina particles.

When the first carrier layer is a coat layer containing a ceria-zirconia complex oxide, alumina, and Pd, Pd on the first carrier layer can sufficient exhibit catalytic effect (exhaust gas conversion performance). In addition, when the second carried layer is an extrudate, the entire honeycomb catalytic converter can be used for conversion of exhaust gas.

In the honeycomb catalytic converter of the present invention, preferably, each partition wall has a thickness of 0.10 to 0.25 mm.

When the partition walls each have a thickness in the above range, the mechanical strength and the exhaust gas conversion performance of the honeycomb catalytic converter can be easily achieved in a balanced manner.

In the honeycomb catalytic converter of the present invention, preferably, the second carrier layer of each partition wall has a thickness of 0.05 to 0.20 mm.

When the second carrier layers each have a thickness in the above range, the second carrier layers can be entirely used for conversion of exhaust gas while the strength is maintained at a high level.

Preferably, the honeycomb catalytic converter of the present invention has a length to diameter ratio (length/diameter) of 0.5 to 1.1.

The honeycomb catalytic converter having a shape with a length to diameter ratio in the above range can easily achieve the required exhaust gas conversion performance while the pressure loss in the honeycomb catalytic converter is kept low.

In the honeycomb catalytic converter of the present invention, preferably, the honeycomb catalytic converter has a diameter of 130 mm or less.

The honeycomb catalytic converter having a diameter of 130 mm or less can be made less susceptible to breakage from thermal shock.

Preferably, the honeycomb catalytic converter of the present invention contains 25 to 75 wt % ceria-zirconia complex oxide.

When the proportion of ceria-zirconia complex oxide is in the above range, the honeycomb catalytic converter can have a higher oxygen storage capacity (OSC).

DESCRIPTION OF EMBODIMENTS

[Honeycomb Catalytic Converter]

First, the honeycomb catalytic converter of the present invention is described.

The honeycomb catalytic converter of the present invention includes a honeycomb structured body in which multiple through-holes are arranged longitudinally in parallel with one another with a partition wall therebetween, and a noble metal supported on the honeycomb structured body.

In the honeycomb catalytic converter of the present invention, the honeycomb structured body contains a ceria-zirconia complex oxide (hereinafter also referred to as "CZ") and alumina.

Whether or not the honeycomb catalytic converter of the present invention contains the above components can be confirmed by X-ray diffraction (XRD).

Figure 1:
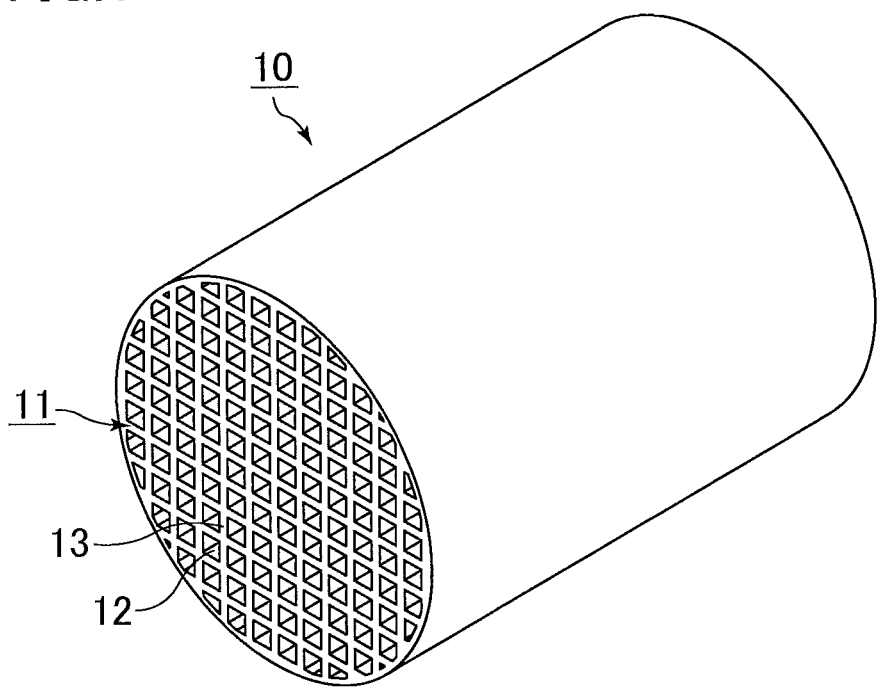
FIG. 1 is a schematic perspective view of an example of a honeycomb catalytic converter of the present invention.

FIG. 1 is a schematic perspective view of an example of the honeycomb catalytic converter of the present invention.

A honeycomb catalytic converter 10 shown in FIG. 1 includes a single honeycomb structured body 11 in which multiple through-holes 12 are arranged longitudinally in parallel with one another with a partition wall 13 therebetween.

The honeycomb structured body 11 contains CZ particles and alumina particles, and carries a noble metal.

In the honeycomb catalytic converter of the present invention, each partition wall includes a first carrier layer defining a surface layer of the partition wall and carrying palladium (Pd) and a second carrier layer located more inwardly of the partition wall than the first carrier layer and carrying rhodium (Rh). In the honeycomb catalytic converter of the present invention, the catalyst (Pd) that oxidizes HC that does not easily diffuse into the partition walls is present in the surface layer of each partition wall, thus achieving higher exhaust gas conversion performance.

Figure 2:
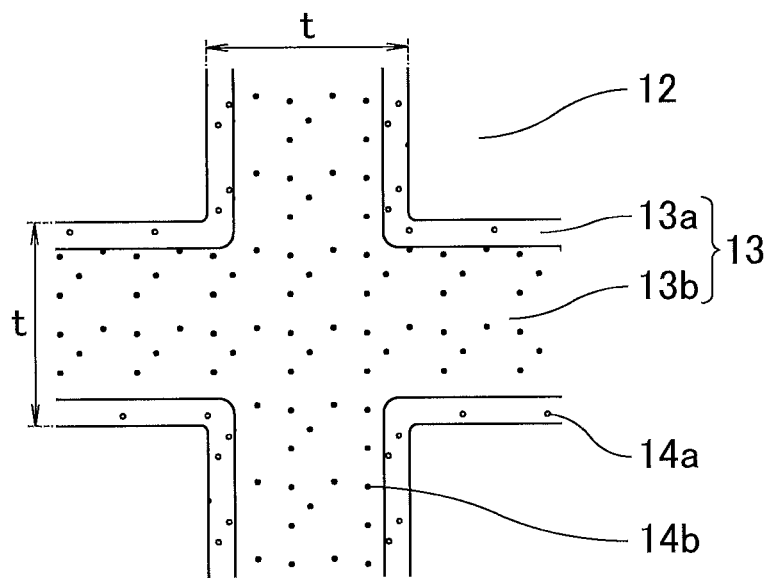
FIG. 2 is a schematic cross-sectional view of an example of partition walls constituting the honeycomb catalytic converter of the present invention.

FIG. 2 is a schematic cross-sectional view of an example of the partition walls constituting the honeycomb catalytic converter of the present invention.

As shown in FIG. 2, each partition wall 13 includes a first carrier layer 13a defining a surface layer of the partition wall 13, and a second carrier layer 13b located more inwardly of the partition wall 13 than the first carrier layer 13a in a thickness direction of the partition wall 13 (direction indicated by a double-headed arrow t in FIG. 2).

Each first carrier layer 13a carries palladium 14a which is a noble metal, and each second carrier layer 13b carries rhodium 14b which is a noble metal.

Figure 3:
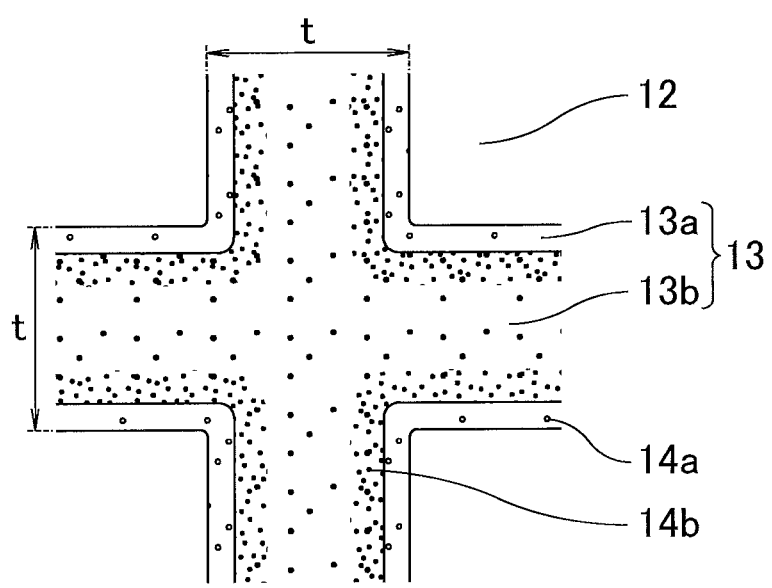
FIG. 3 is a schematic cross-sectional view of another example of partition walls constituting the honeycomb catalytic converter of the present invention.

FIG. 3 is a schematic cross-sectional view of another example of partition walls constituting the honeycomb catalytic converter of the present invention. As shown in FIG. 3, the rhodium 14b may be supported in a concentrated manner on the first carrier layer 13a side.

When Rh is supported in a concentrated manner on the first carrier layer side, the Rh exhibits NOx conversion effect before exhaust gas reaches near the center of the partition wall. This makes it possible to increase exhaust gas conversion performance at the time of warm-up operation (which is also referred to as "warm-up performance") during which exhaust gas does not easily diffuse into the partition walls.

Herein, that "Rh supported on the second carrier layer is concentrated on the first on the first carrier layer side" can be confirmed by element mapping of a cross section of the partition walls cut in a direction perpendicular to a longitudinal direction of the honeycomb catalytic converter by an EPMA or the like.

Specifically, first, a combination of a 10 μm×10 μm region in the center (a central portion in the thickness direction) of a second carrier layer and a 10 μm×10 μm region on a surface of the second carrier layer away from the center and located on the first carrier layer side is selected from second carrier layer portions in an element mapping image of the partition walls. Ten such combinations are randomly selected. Subsequently, in each combination of the regions, the Rh concentration is compared between the 10 μm×10 μm region in the center of the second carrier layer and the 10 μm×10 μm region on the surface of the second carrier layer. When the Rh concentration in the 10 μm×10 μm region on the surface of the second carrier layer is higher than the Rh concentration in the 10 μm×10 μm region in the center of the second carrier layer in all the combinations, the Rh concentration of on the surface on the first carrier layer side of the second carrier layer is determined to be higher than the Rh concentration in the center of the second carrier layer. The concentration of the noble metal can be determined from the hue and shade of the element mapping image.

The honeycomb structured body defining the honeycomb catalytic converter of the present invention may include a single honeycomb fired body or multiple honeycomb fired bodies, and the multiple honeycomb fired bodies may be combined together with an adhesive layer.

The honeycomb fired body is produced by extrusion-molding a raw material paste containing ceria-zirconia composite oxide particles (hereinafter also referred to as "CZ particles") and alumina particles, and firing the resulting extrudate.

In the honeycomb catalytic converter of the present invention, preferably, the second carrier layer is preferably formed by supporting Rh on the honeycomb fired body obtained by firing an extrudate containing ceria-zirconia composite oxide particles and alumina particles.

Each partition wall constituting the honeycomb fired body may include a coat layer on a surface.

The first carrier layer can be formed by forming a coat layer containing Pd.

Preferably, the first carrier layer is a coat layer containing a ceria-zirconia composite oxide, alumina, and Pd.

The honeycomb catalytic converter of the present invention may include a peripheral coat layer on the outer periphery of the honeycomb fired body.

In order to increase thermal shock resistance, preferably, CZ particles contained in the honeycomb catalytic converter of the present invention have an average particle size of 1 to 50 μm. The average particle size of the CZ particles is more preferably 1 to 30 μm.

When the CZ particles have an average particle size of 1 to 50 μm, the resulting honeycomb catalytic converter has a larger surface area, thus achieving a higher OSC.

The alumina particles contained in the honeycomb catalytic converter of the present invention may have any average particle size. Yet, in order to increase exhaust gas conversion performance, the average particle size is preferably 1 to 10 μm, more preferably 1 to 5 μm.

The average particle sizes of the CZ particles and alumina particles contained in the honeycomb catalytic converter can be determined by taking a scanning electron microscope (SEM) image of the honeycomb catalytic converter with a SEM (S-4800 available from Hitachi High-Technologies Corporation).

Preferably, the honeycomb catalytic converter of the present invention contains 25 to 75 wt % ceria-zirconia complex oxide.

When the proportion of the ceria-zirconia complex oxide is in the above range, the honeycomb catalytic converter can achieve a higher OSC.

Preferably, the honeycomb catalytic converter of the present invention contains 15 to 35 wt % alumina particles.

In the honeycomb catalytic converter of the present invention, ceria in the ceria-zirconia complex oxide of the CZ particles has an OSC. The ceria-zirconia complex oxide preferably forms a solid solution of ceria and zirconia.

In the honeycomb catalytic converter of the present invention, the amount of ceria in the ceria-zirconia complex oxide is preferably 30 wt % or more, more preferably 40 wt % or more, and preferably 90 wt % or less, more preferably 80 wt % or less. The amount of zirconia in the ceria-zirconia complex oxide is preferably 60 wt % or less, more preferably 50 wt % or less. Such a ceria-zirconia complex oxide has a high ceria content and thus has a high OSC.

In the honeycomb catalytic converter of the present invention, the alumina particles may be of any type, but θ-phase alumina particles (hereinafter also referred to as "θ-alumina particles") are preferred.

Use of θ-phase alumina particles as dividers for the ceria-zirconia complex oxide can inhibit sintering of alumina particles to one another by heat during use, allowing for sustained catalytic function. Further, use of θ-phase alumina particles can increase heat resistance.

The honeycomb catalytic converter of the present invention preferably contains inorganic particles used as an inorganic binder during the production, and more preferably contains γ-alumina particles derived from boehmite.

The honeycomb catalytic converter of the present invention, preferably contains inorganic fibers, more preferably alumina fibers.

The honeycomb catalytic converter containing inorganic fibers such as alumina fibers can have better mechanical characteristics.

The inorganic fibers are those having an aspect ratio of 5 or more, and the inorganic particles are those having an aspect ratio of less than 5.

The honeycomb catalytic converter of the present invention preferably has a length to diameter ratio (length/diameter) of 0.5 to 1.1, more preferably 0.6 to 0.8.

In the honeycomb catalytic converter of the present invention, the diameter of the honeycomb catalytic converter is preferably 130 mm or less, more preferably 125 mm or less. The diameter of the honeycomb catalytic converter is also preferably 85 mm or more.

In the honeycomb catalytic converter of the present invention, the length of the honeycomb catalytic converter is preferably 65 to 120 mm, more preferably 70 to 110 mm.

The shape of the honeycomb catalytic converter of the present invention is not limited to a round pillar shape. Examples include a prism, a cylindroid shape, a pillar shape having an end face with a racetrack shape, and a prism with rounded corners (e.g., a triangular pillar shape with rounded corners).

In the honeycomb catalytic converter of the present invention, preferably, all the partition walls have the same thickness. Specifically, the thickness of each partition wall of the honeycomb catalytic converter is preferably 0.10 to 0.25 mm, more preferably 0.10 to 0.15 mm.

In the honeycomb catalytic converter of the present invention, the thickness of the first carrier layer on one side of each partition wall is preferably 0.01 to 0.10 mm, more preferably 0.02 to 0.05 mm.

In the honeycomb catalytic converter of the present invention, the thickness of the second carrier layer on one side of each partition wall is preferably 0.05 to 0.20 mm, more preferably 0.05 to 0.15 mm.

In the honeycomb catalytic converter of the present invention, the shape of the through-holes is not limited to a quadrangular pillar shape. For example, it may be a triangular pillar shape or a hexagonal pillar shape.

In the honeycomb catalytic converter of the present invention, preferably, the density of the through-holes in a cross section perpendicular to the longitudinal direction of the honeycomb catalytic converter is 31 to 155 pcs/cm$^2$.

Preferably, the honeycomb catalytic converter of the present invention has a porosity of 40 to 70%. When the porosity of the honeycomb catalytic converter is in the above range, the honeycomb catalytic converter can exhibit high exhaust gas conversion performance while the strength is maintained.

The porosity of the honeycomb catalytic converter can be measured by a weighing method described below.

(1) The honeycomb catalytic converter is cut in size of 10 cells×10 cells×10 mm to obtain a measurement sample. The measurement sample is ultrasonically washed with deionized water and acetone, and dried in an oven at 100° C. The measurement sample with a size of 10 cells×10 cells×10 mm is a sample that is cut out such that the sample includes outermost through-holes and partition walls defining these through-holes and has a longitudinal length of 10 mm, with 10 through-holes aligned longitudinally×10 through-holes aligned transversely.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample based on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) The actual weight of the measurement sample is measured using an electric balance (HR202i available from A & D).

(6) The porosity of the honeycomb catalytic converter is determined by the following formula.

(Porosity of honeycomb catalytic converter)=100−
(actual weight of measurement sample/weight
of measurement sample based on assumption
that the measurement sample is a completely
dense body)×100[%]

The honeycomb catalytic converter of the present invention may include a peripheral coat layer on the outer periphery of the honeycomb fired body. In that case, the thickness of the peripheral coat layer is preferably 0.1 to 2.0 mm.

In the honeycomb catalytic converter of the present invention, noble metals are supported on the honeycomb structured body.

Examples of the noble metals include Pd supported on the first carrier layers and Rh supported on the second carrier layers.

When supporting Rh on the second carrier layer, if it is desired that Rh is supported in a concentrated manner on the surface side of each second carrier layer the surface on which the first carrier layer is to be formed in the later step), Rh may be supported by a method that includes impregnating the honeycomb fired body with a rhodium nitrate solution, for example.

In the honeycomb catalytic converter of the present invention, the total amount of the noble metals supported is preferably 0.1 to 15 g/L, more preferably 0.5 to 10 g/L.

The term "amount of the noble metals supported" as used herein refers to the weight of the noble metals per apparent volume of the honeycomb catalytic converter. The apparent volume of the honeycomb catalytic converter includes the volume of pores and cells, and it includes the volume of the peripheral coat layer and/or the volume of an adhesive layer.

[Method of Producing Honeycomb Catalytic Converter]

Next, a method of producing the honeycomb catalytic converter of the present invention is described.

The method of producing the honeycomb catalytic converter of the present invention may be, for example, a method that includes a supporting step of supporting Rh on a honeycomb fired body produced by the method described below, and a coat layer forming step of forming a coat layer containing Pd, CZ raw materials, and alumina particles on a surface of each partition wall.

(Production of Honeycomb Fired Body)

First, a method of producing a honeycomb fired body is described.

The method of producing a honeycomb fired body may be, for example, a method that includes a molding step of molding a raw material paste containing CZ particles and alumina particles into a honeycomb molded body in which multiple through-holes are arranged longitudinally in parallel with one another with a partition wall therebetween, and a firing step of firing the honeycomb molded body to produce a honeycomb fired body.

(Molding Step)

In the molding step, first, a raw material paste containing CZ particles and alumina particles is prepared.

The types, average particle sizes, and the like of the CZ particles and the alumina particles have been described in the above section [Honeycomb catalytic converter], so that a detailed description is omitted.

The average particle sizes of the CZ particles and the alumina particles used as raw materials of the honeycomb catalytic converter can be determined by a laser diffraction particle size distribution meter (Mastersizer 2000 available from Malvern Panalytical).

Examples of other raw materials used to prepare the raw material paste include inorganic fibers, inorganic binders, organic binders, forming auxiliaries, and dispersion media.

The inorganic fibers may be made of any material. Examples include alumina, silica, silicon carbide, silica alumina, glass, potassium titanate, and aluminum borate. Two or more of these may be used in combination. Of these, alumina fibers are preferred.

The inorganic fibers preferably have an aspect ratio of 5 to 300, more preferably 10 to 200, still more preferably 10 to 100.

Any inorganic binder may be used. Examples include solids contained in materials such as alumina sol, silica sol, titania sol, sodium silicate, sepiolite, attapulgite, and boehmite. Two or more of these inorganic binders may be used in combination.

Of these inorganic binders, boehmite is preferred. Boehmite is alumina monohydrate with a composition of AlOOH, and has good dispersibility in media such as water. Thus, boehmite is preferably used as an inorganic binder.

Any organic binder may be used. Examples include methyl cellulose, carboxymethyl cellulose, hydroxyethyl cellulose, polyethylene glycol, phenolic resin, and epoxy resin. Two or more of these may be used in combination.

Any pore-forming agent may be used. Examples include acrylic resins, coke, and starch. In the present invention, use of two or more selected from acrylic resins, coke, and starch is preferred.

The pore-forming agent is one that is used to introduce pores into a honeycomb fired body when producing a honeycomb fired body.

Any forming auxiliary may be used. Examples include ethylene glycol, dextrins, fatty acids, fatty acid soaps, and polyalcohols. Two or more of these may be used in combination.

Any dispersion medium may be used. Examples include water, organic solvents such as benzene, and alcohols such as methanol. Two or more of these may be used in combination.

When the CZ particles, alumina particles, alumina fibers, and boehmite are used as the materials of the raw material paste, the proportions of these materials relative to the total solids remaining in the raw material paste after the firing step are preferably as follows: CZ particles: 25 to 75 wt %; alumina particles: 15 to 35 wt %; alumina fibers: 5 to 15 wt %, and boehmite: 5 to 20 wt %.

Preparation of the raw material paste preferably involves mixing/kneading of the raw materials. A device such as a mixer or an attritor may be used for mixing, or a device such as a kneader may be used for kneading.

After a raw material paste is prepared by the above method, the raw material paste is molded into a honeycomb molded body in which multiple through-holes are arranged longitudinally in parallel with one another with a partition wall therebetween.

Specifically, the raw material paste is extrusion-molded into a honeycomb molded body. More specifically, the raw material paste is passed through a die of a specific shape to form a continuous honeycomb molded body having through-holes of a specific shape, and the continuous honeycomb molded body is cut to a specific length, whereby a honeycomb molded body is obtained.

Next, preferably, a dryer such a microwave dryer, a hot-air dryer, a dielectric dryer, a reduced-pressure dryer, a vacuum dryer, or a freeze-dryer is used to dry the honeycomb molded body to produce a honeycomb dried body.

Herein, the honeycomb molded body and the honeycomb dried body before the firing step are also collectively referred to as a "honeycomb molded body".

(Firing Step)

In the firing step, the honeycomb molded body is fired to produce a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb fired body can be produced by the above steps.

Subsequently, the supporting step of supporting Rh on the partition walls of the honeycomb fired body is described.

(Supporting Step)

In the supporting step, Rh is supported on the honeycomb fired body to form a second carrier layer.

For example, Rh is supported on the partition walls by a method that includes immersing the honeycomb fired body in a Rh-containing solution, removing the honeycomb fired body from the solution, and heating or drying the honeycomb structured body.

The Rh-containing solution may be, for example, a dispersion of Rh particles or a solution of rhodium nitrate.

In the supporting step, preferably, Rh is preferentially supported on the surface of each partition wall of the honeycomb fired body so that the Rh concentration on the first carrier layer side of the second carrier layer is higher than the Rh concentration in the center of the second carrier layer.

For example, Rh is preferentially supported on the surface of each partition wall by a method that includes immersing the honeycomb fired body in a Rh-containing solution which is easily adsorbed onto the surface of the partition wall, removing the honeycomb fired body from the solution, and heating or drying the honeycomb structured body.

Example of the Rh-containing solution which is easily adsorbed onto the surface of each partition wall of the honey fired body includes a solution containing a Rh complex.

Here, the pH of the above solution is adjusted 1.5 to 5.0 to facilitate adsorption of Rh onto the surface of the partition wall.

The pH of the solution can be adjusted by adding a pH adjuster. The pH adjuster is preferably free of halogens such as fluorine, chlorine, and bromine, and sulfur. Examples include nitric acid and oxalic acid.

Subsequently, a description is given on the coat layer forming step of forming, on the second carrier layer, a coat layer including Pd, CZ particles, and alumina particles, which defines the first carrier layer.

(Coat Layer Forming Step)

First, a slurry for forming a coat layer, which is a raw material of the coat layer, is prepared.

The slurry for forming a coat layer is obtained by mixing CZ particles, alumina particles, and a Pd-containing material with a solvent.

The Pd-containing material may be a dispersion of Pd particles or a solution of a Pd complex or a Pd-containing salt.

The order of mixing various raw materials is not limited. In one method, CZ particles, alumina particles, a Pd-containing material, and a solvent are mixed together at once. In another method, CZ particles and a Pd-containing material are first mixed together to obtain Pd-carrying CZ particles, and subsequently, the Pd-carrying CZ particles, alumina particles, and a solvent are mixed together. In yet another method, alumina particles and a Pd-containing material are first mixed together to obtain a Pd-carrying alumina particles, and subsequently, the Pd-carrying alumina particles, CZ particles, and a solvent are mixed together.

Examples of other raw materials used to prepare the slurry for forming a coat layer include inorganic binders and dispersion media.

Such other raw materials are preferably those used in the raw material paste to produce a honeycomb molded body.

The honeycomb fired body in which Rh is supported on the partition walls is immersed in the slurry for forming a coat layer, and removed from the slurry, followed by drying and firing, whereby the honeycomb catalytic converter of the present invention can be obtained in which the coat layer containing Pd is formed on the surface of each partition wall constituting the honeycomb fired body carrying Rh.

The total amount of the noble metals supported in the coat layer forming step is preferably adjusted to 0.1 to 15 g/L, more preferably 0.5 to 10 g/L.

(Other Steps)

When a peripheral coat layer is formed on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. The peripheral coat layer paste may have the same composition as that of the raw material paste.

Preferably, the step of forming a peripheral coat layer is performed after the coat layer forming step.

When a honeycomb structured body in which multiple honeycomb fired bodies are combined together with an adhesive layer therebetween is used, the honeycomb structured body can be produced by applying an adhesive layer paste to the outer periphery of each honeycomb fired body excluding both end faces thereof, combining the honeycomb fired bodies, and solidifying the adhesive layer paste by drying. The adhesive layer paste may have the same composition as that of the raw material paste.

EXAMPLES

Examples that more specifically disclose the present invention are described below. The present invention is not limited to these examples.
[Production of Honeycomb Catalytic Converter]

Example 1

The following materials were mixed/kneaded to prepare a raw material paste: CZ particles ($CeO_2:ZrO_2=3:7$ (weight ratio), average particle size: 2 μm) (26.4 wt %), θ-alumina particles (average particle size: 2 μm) (13.2 wt %), alumina fibers (average fiber diameter: 3 μm; average fiber length: 60 μm) (5.3 wt %), boehmite as an inorganic binder (11.3 wt %), methyl cellulose as an organic binder (5.3 wt %), acrylic resin as a pore-forming agent (2.1 wt %), coke also as a pore-forming agent (2.6 wt %), polyoxyethylene oleyl ether (surfactant) as a forming auxiliary (4.2 wt %), and deionized water (29.6 wt %).

Using an extruder, the raw material paste was extrusion-molded into a round pillar-shaped honeycomb molded body. Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body was produced. The honeycomb fired body had a round pillar shape with a diameter of 103 mm and a length of 105 mm in which the density of the through-holes was 77.5 pcs/$cm^2$ (500 cpsi) and the thickness of each partition wall was 0.076 mm (3 mil).
(Supporting Step)

The honeycomb fired body was immersed and kept in a rhodium nitrate solution ($Rh(NO_3)_3$, Rh concentration: 30 g/L) for 24 hours. Subsequently, the honeycomb fired body was removed from the rhodium nitrate solution, dried at 110° C. for 2 hours, and fired at 500° C. for 1 hour in a nitrogen atmosphere, whereby Rh was supported on the surface of each partition wall constituting the honeycomb fired body.

The amount of Rh supported was 0.4 g/L per apparent volume of the honeycomb fired body.

(Preparation of Slurry for Forming Coat Layer)
CZ particles ($CeO_2:ZrO_2=3:7$ (weight ratio), average particle diameter: 2 μm) (40 parts by weight) and θ-alumina particles (average particle diameter: 2 μm) (60 parts by weight) were added to a palladium nitrate solution and mixed together, and the solvent was dried, followed by firing at 500° C. for 1 hour, whereby Pd-carrying particles in which Pd was supported in the CZ particles and the alumina particles were obtained. Subsequently, the thus-obtained Pd-carrying particles (100 parts by weight) were mixed with ion-exchanged water (400 parts by weight), whereby a slurry for forming a coat layer was prepared.
(Formation of Coat Layer)

The Rh-carrying honeycomb fired body was immersed in the slurry for forming a coat layer. Then, the honeycomb fired body was removed from the slurry for forming a coat layer, and excess slurry attached to the honeycomb fired body was blown off by a blower. Subsequently, the honeycomb fired body was dried at 80° C. for 24 hours, and fired at 500° C. for 1 hour, whereby a honeycomb catalytic converter according to Example 1 in which a coat layer containing a Pd was formed on the surface of each partition wall was obtained.

The amount of Pd supported was 1.2 g/L per apparent volume of the honeycomb catalytic converter.

Comparative Example 1

A honeycomb catalytic converter according to Comparative Example 1 was obtained as in Example 1, except that the solution used in the supporting step was changed to a palladium nitrate solution (Pd concentration: 100 g/L) and that palladium nitrate used to produce the slurry for forming a coat layer was changed to rhodium nitrate whose amount was one-third of the amount of the rhodium nitrate.

In the honeycomb catalytic converter according to Comparative Example 1, Pd was supported on the partition walls constituting the honeycomb fired body, and the coat layer carrying Rh was formed on the surface of each partition wall.

The amount of the noble metals, in terms of total amount of Pd and Rh, supported on the honeycomb catalytic converter according to Comparative Example 1 was 1.6 g/L per apparent volume of the honeycomb fired body.
(Measurement of HC Conversion Performance)

Each of the honeycomb catalytic converters according to Example 1 and Comparative Example 1 was set in a V6-3.5 L engine, and the temperature when the HC concentration ((HC inflow−HC outflow)/(HC inflow)×100) was 50% or lower from the start of the stoichiometric engine was measured to evaluate the HC conversion performance.

Table 1 shows the results.

|  | First carrier layer | | | Second carrier layer | | | Evaluation of HC conversion per foam one [° C.] |
| --- | --- | --- | --- | --- | --- | --- | --- |
|  | Type of noble metal | Concentration [g/L] | Thickness [μm] | Type of noble metal | Concentration [g/L] | Thickness [μm] |  |
| Example 1 | Pd | 1.2 | 25 | Rh | 0.4 | 76 | 265 |
| Comparative Example 1 | Rh | 0.4 | 25 | Pd | 1.2 | 76 | 300 |

The results in Table 1 show that the temperature at which the HC concentration is 50% or lower is lower in the honeycomb catalytic converter according to Example 1 than that in the honeycomb catalytic converter according to Comparative Example 1. Thus, the honeycomb catalytic converter according to Example 1 has excellent. HC conversion performance.

REFERENCE SIGNS LIST 10 honeycomb catalytic converter
11 honeycomb structured body
12 through-hole
13 partition wall
13a first carrier layer
13b second carrier layer
14a noble metal (palladium)
14b noble metal (rhodium)

The invention claimed is:

1. A honeycomb catalytic converter comprising:
a honeycomb structured body in which multiple through-holes are arranged longitudinally in parallel with one another with a partition wall therebetween; and
a noble metal supported on the honeycomb structured body,
wherein the honeycomb structured body contains a ceria-zirconia complex oxide and alumina,
each partition wall includes a first carrier layer defining a surface layer of the partition wall and carrying Pd, and a second carrier layer located more inwardly of the partition wall than the first carrier layer and carrying Rh, and
each partition wall has a thickness of 0.10 to 0.25 mm.

2. The honeycomb catalytic converter according to claim 1,
wherein the Rh concentration on the first carrier layer side of the second carrier layer is higher than the Rh concentration in the center of the second carrier layer.

3. The honeycomb catalytic converter according to claim 2,
wherein the honeycomb structured body further contains an inorganic binder.

4. The honeycomb catalytic converter according to claim 2,
wherein the first carrier layer is a coat layer containing a ceria-zirconia complex oxide, alumina, and Pd, and the second carrier layer is an extrudate containing ceria-zirconia complex oxide particles and alumina particles.

5. The honeycomb catalytic converter according to claim 2,
wherein each second carrier layer has a thickness of 0.05 to 0.20 mm.

6. The honeycomb catalytic converter according to claim 2,
wherein the honeycomb catalytic converter has a length to diameter ratio (length/diameter) of 0.5 to 1.1.

7. The honeycomb catalytic converter according to claim 2,
wherein the honeycomb catalytic converter has a diameter of 130 mm or less.

8. The honeycomb catalytic converter according to claim 2,
wherein the honeycomb catalytic converter contains 25 to 75 wt % ceria-zirconia complex oxide.

9. The honeycomb catalytic converter according to claim 1,
wherein the honeycomb structured body further contains an inorganic binder.

10. The honeycomb catalytic converter according to claim 9,
wherein the first carrier layer is a coat layer containing a ceria-zirconia complex oxide, alumina, and Pd, and the second carrier layer is an extrudate containing ceria-zirconia complex oxide particles and alumina particles.

11. The honeycomb catalytic converter according to claim 1,
wherein the first carrier layer is a coat layer containing a ceria-zirconia complex oxide, alumina, and Pd, and the second carrier layer is an extrudate containing ceria-zirconia complex oxide particles and alumina particles.

12. The honeycomb catalytic converter according to claim 1,
wherein the honeycomb catalytic converter has a diameter of 130 mm or less.

13. The honeycomb catalytic converter according to claim 1,
wherein the honeycomb catalytic converter contains 25 to 75 wt % ceria-zirconia complex oxide.

14. A honeycomb catalytic converter comprising:
a honeycomb structured body in which multiple through-holes are arranged longitudinally in parallel with one another with a partition wall therebetween; and
a noble metal supported on the honeycomb structured body,
wherein the honeycomb structured body contains a ceria-zirconia complex oxide and alumina,
each partition wall includes a first carrier layer defining a surface layer of the partition wall and carrying Pd, and a second carrier layer located more inwardly of the partition wall than the first carrier layer and carrying Rh, and
each second carrier layer has a thickness of 0.05 to 0.20 mm.

15. The honeycomb catalytic converter according to claim 14,
wherein each partition wall has a thickness of 0.10 to 0.25 mm.

16. A honeycomb catalytic converter comprising:
a honeycomb structured body in which multiple through-holes are arranged longitudinally in parallel with one another with a partition wall therebetween; and
a noble metal supported on the honeycomb structured body,
wherein the honeycomb structured body contains a ceria-zirconia complex oxide and alumina,
each partition wall includes a first carrier layer defining a surface layer of the partition wall and carrying Pd, and a second carrier layer located more inwardly of the partition wall than the first carrier layer and carrying Rh, and
the honeycomb catalytic converter has a length to diameter ratio (length/diameter) of 0.5 to 1.1.

17. The honeycomb catalytic converter according to claim 16,
wherein each partition wall has a thickness of 0.10 to 0.25 mm.

* * * * *